May 26, 1953  H. W. MADDEN  2,639,823
TIN CAN STACKER

Filed May 26, 1950  5 Sheets-Sheet 1

Inventor
Homer W. Madden
By John N. Randolph
Attorney

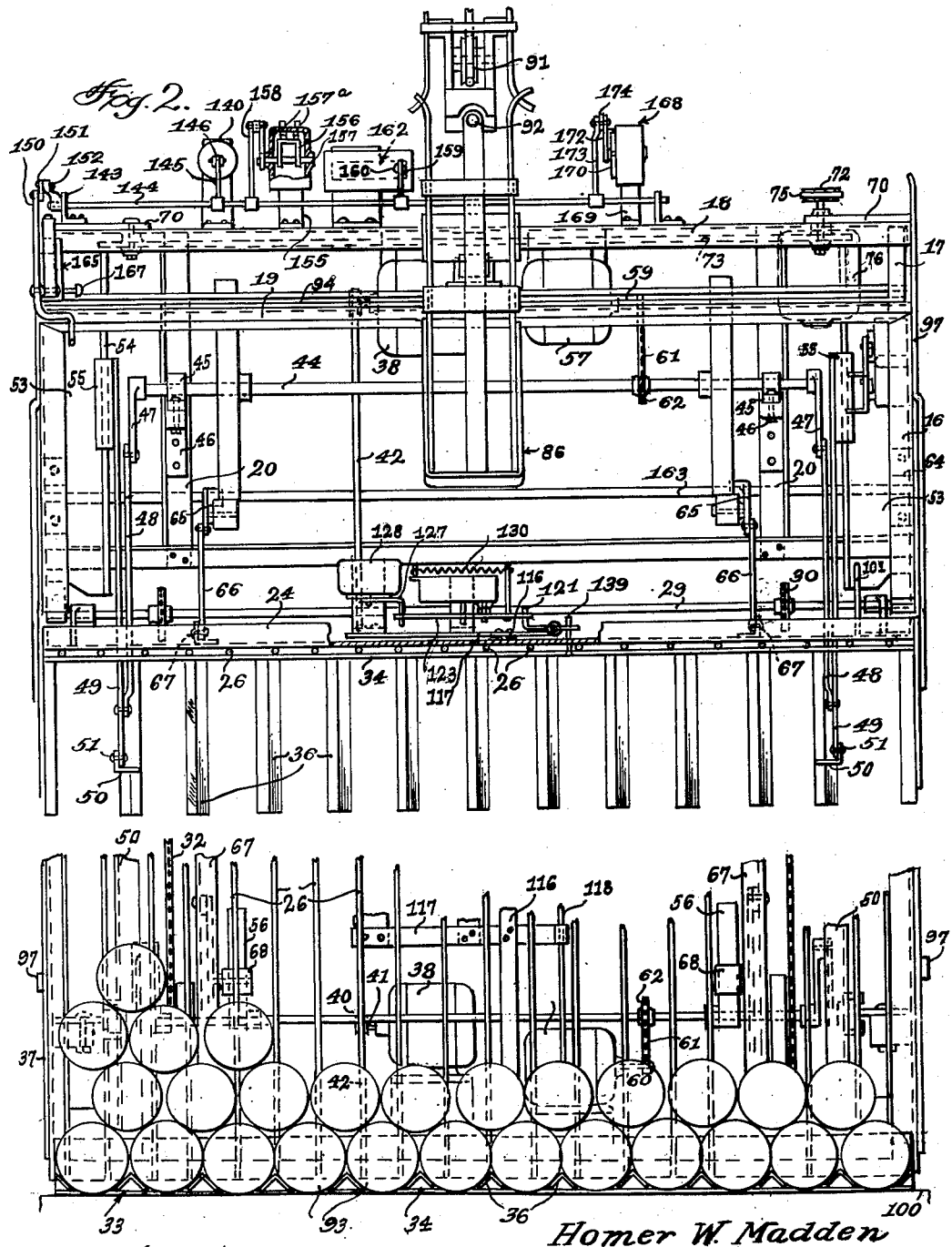

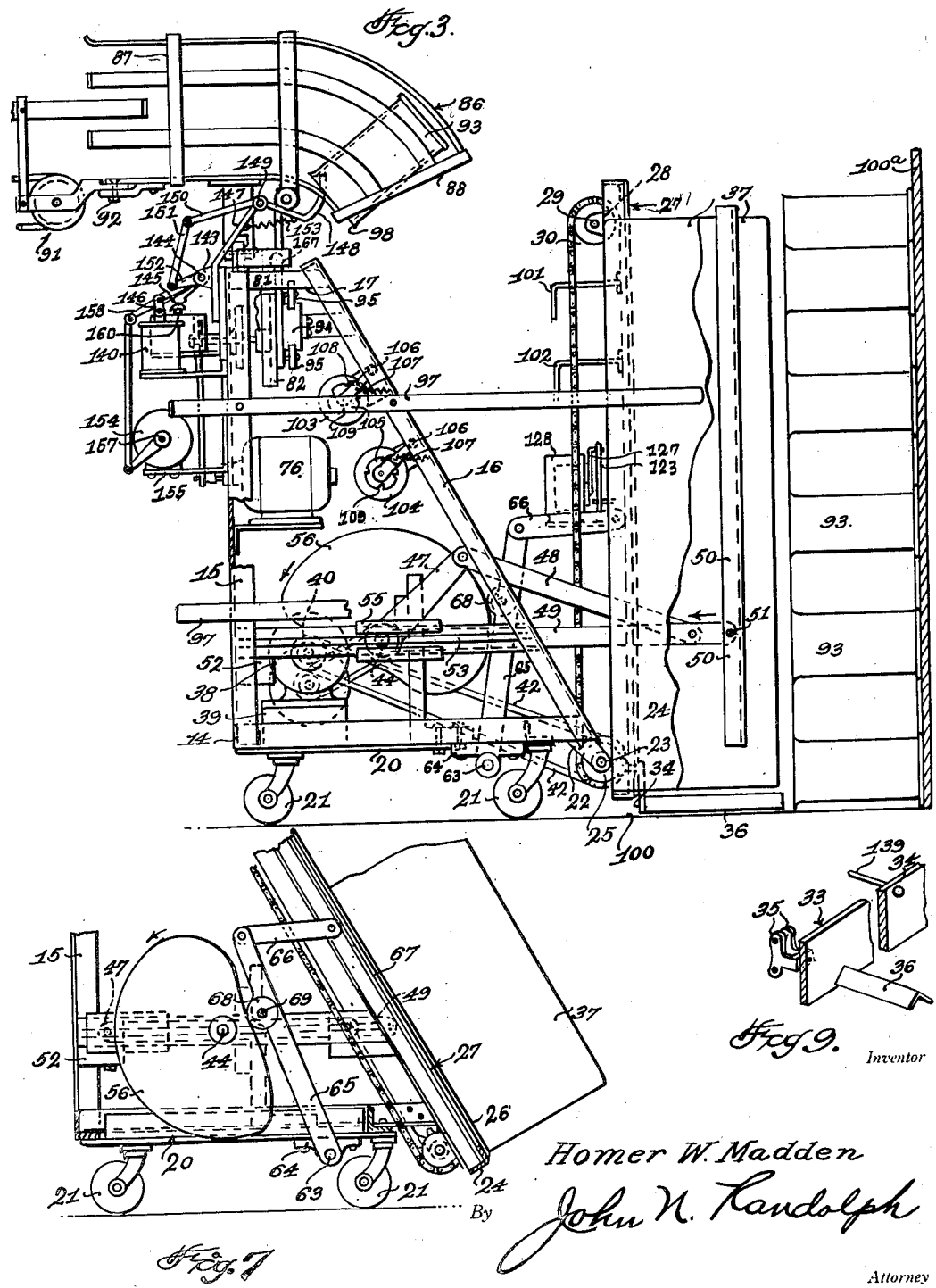

May 26, 1953  H. W. MADDEN  2,639,823
TIN CAN STACKER
Filed May 26, 1950  5 Sheets-Sheet 4
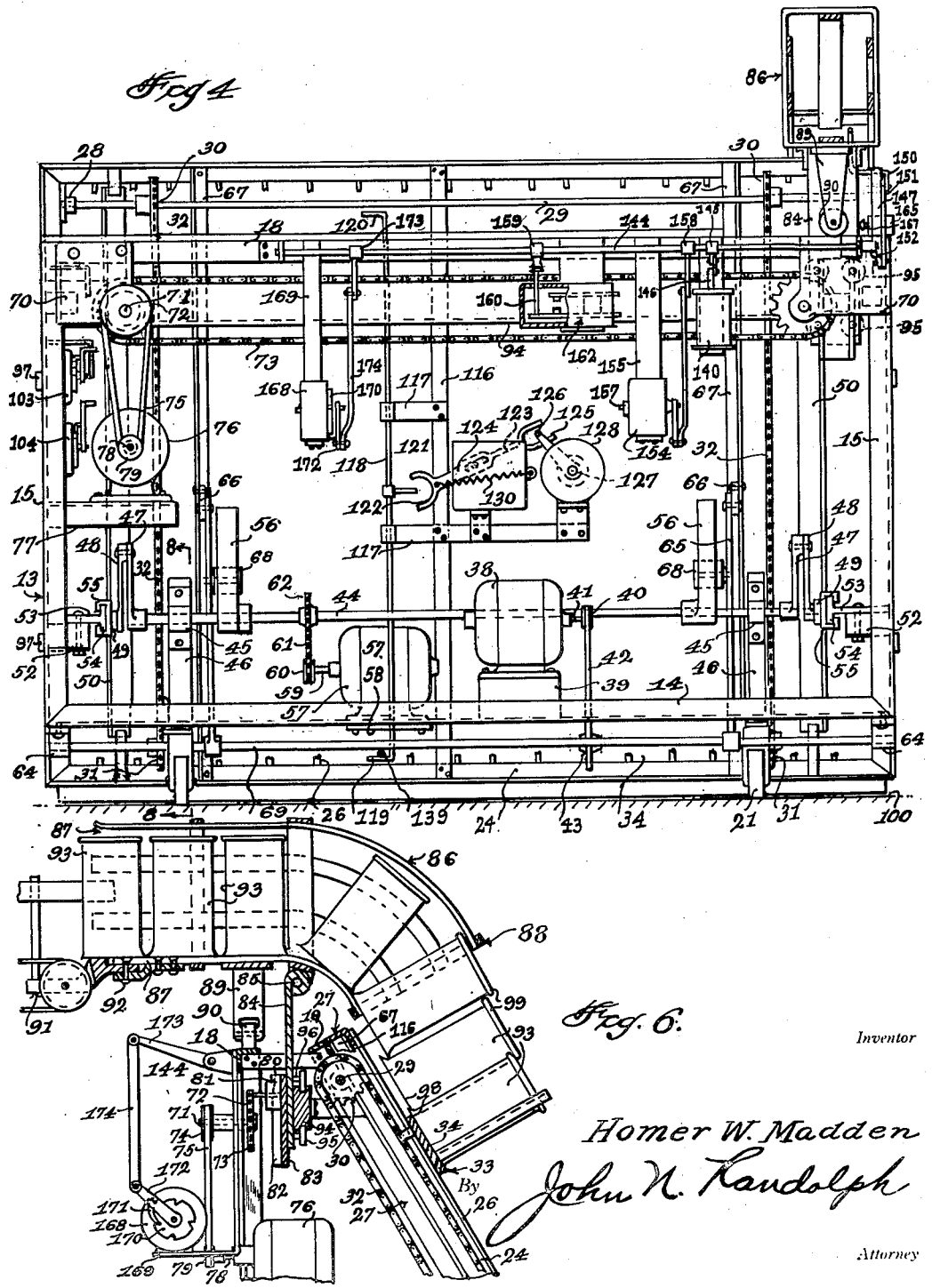
Inventor
Homer W. Madden
By John N. Randolph
Attorney May 26, 1953  H. W. MADDEN  2,639,823
TIN CAN STACKER
Filed May 26, 1950  5 Sheets-Sheet 5
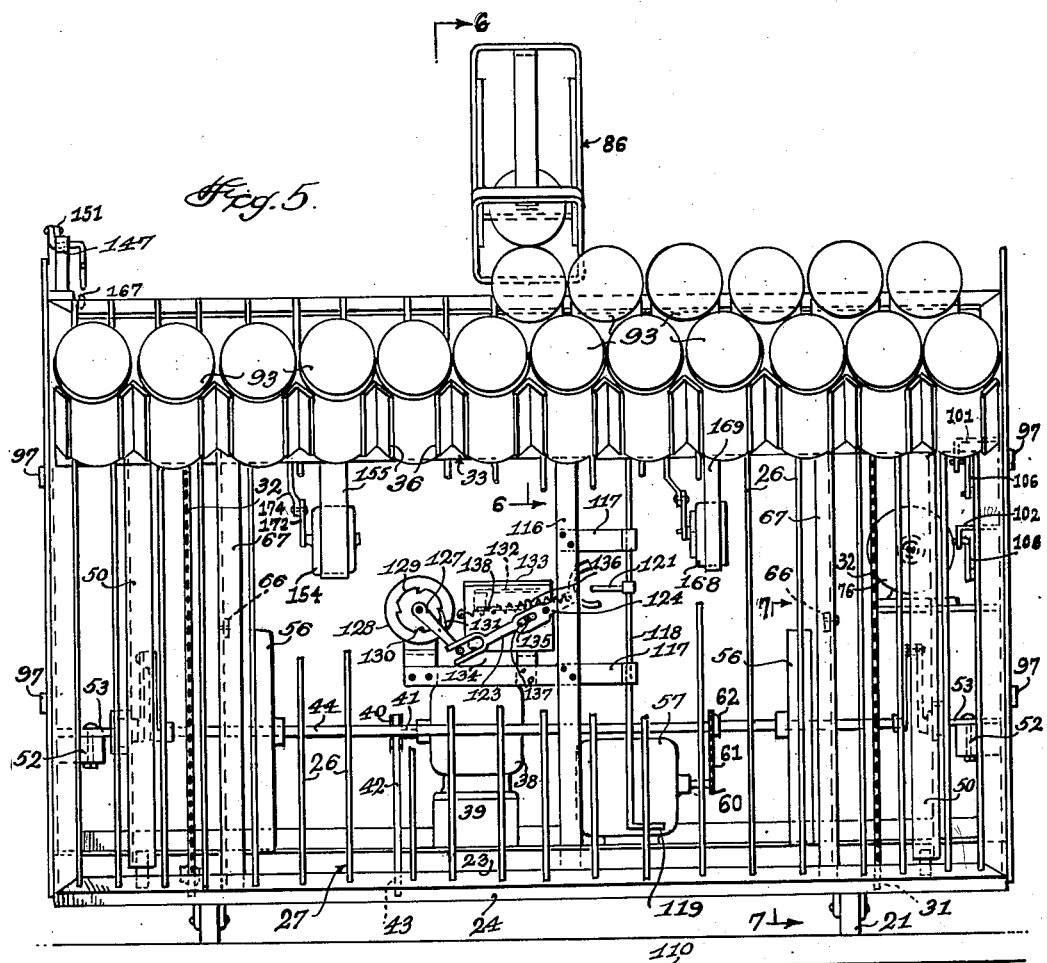
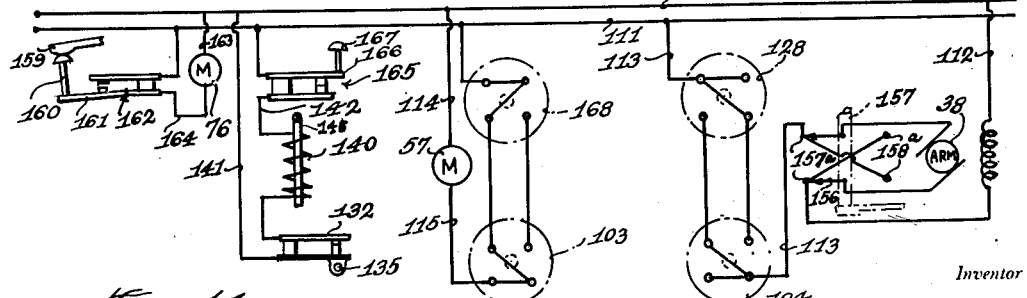
Inventor
Homer W. Madden
By John N. Randolph
Attorney Patented May 26, 1953

2,639,823

UNITED STATES PATENT OFFICE 2,639,823

TIN CAN STACKER

Homer W. Madden, Hanover, Ind.

Application May 26, 1950, Serial No. 164,425

16 Claims. (Cl. 214—6)

This invention relates to a machine for stacking tin cans and more particularly to a machine which will eliminate the slow operation, previously performed manually, of stacking tin cans for storage or shipment.

More particularly, it is the primary object of the present invention to provide a machine for stacking empty tin cans for shipment to canneries or the like and/or for stacking empty tin cans after shipment for storage at canneries and whereby the tin cans may be fed singularly to the machine and initially stacked thereon in an inclined position, thereafter disposed with the stack of the cans supported by the machine in an upright position and finally disengaged from the machine and positioned in abutting engagement against a previously positioned vertical row or stack of cans and with each of the cans in the stack disposed with its longitudinal axis in a horizontal plane.

Still a further object of the invention is to provide a machine having a mobile support and cam and lever means for disengaging a stack of cans from the machine and by means of which a thrust is exerted on the stack of cans for either displacing the cans away from the machine, if the machine is disposed stationary and the cans are being stacked upon a movable dolly, or for displacing the machine away from the stack, if the cans are being stacked by the machine on a stationary platform or supporting surface.

Still a further object of the invention is to provide a machine which will operate automatically with electric motors for actuating moving parts thereof and having switch means for intermittently energizing and de-energizing the motors whereby the cans are fed onto an inclined supporting surface of the machine by a driven feeder which reciprocates back and forth across the top of the machine as an elevator which supports the bottom row of cans moves downwardly relatively to the inclined supporting surface and whereby after the elevator reaches a lowermost position at which time said inclined supporting surface is completely filled with cans, the traversing feeder and elevator will be stopped and said surface thereafter swung to an upright position and the cans then disengaged from the machine either by being displaced out of engagement therewith or by the machine being displaced away from the cans.

A further object of the invention is to provide a machine having switch controlled electric means for thereafter causing the can supporting surface to resume an inclined position so the elevator can be rapidly returned to a position adjacent the top of said inclined surface for receiving the bottom row of another stack of cans thereafter fed thereto from the feeder and when the traversing operation of the feeder is resumed after return of the elevator to an uppermost position.

Still a further object of the invention is to provide a stop means associated with the feeder and which prevents the cans being fed therefrom while the inclined surface is in an upright position and before the elevator has resumed an uppermost position after discharge of a stack of cans therefrom.

Numerous other objects and advantages of the invention will hereinafter become more fully apparent from the following description of the drawings, illustrating a presently preferred embodiment thereof, and wherein:

Figure 2 is a top plan view, partly in section of the machine but with the parts thereof disposed for discharging a stack of cans therefrom;

Figure 3 is a side elevational view partly in section of the machine in a discharging position;

Figure 4 is a rear elevational view of the machine looking from left to right of Figure 3;

Figure 5 is a front elevational view of the machine, partly broken away, looking from right to left of Figure 1 and with the parts disposed in the same position as in Figure 1;

Figure 6 is a fragmentary vertical sectional view taken substantially along a plane as indicated by the line 6—6 of Figure 5;

Figure 7 is a vertical sectional view taken substantially along a plane as indicated by the line 7—7 of Figure 5;

Figure 9 is a fragmentary perspective view of a portion of the elevator;

Figure 10 is a fragmentary front elevational view showing the elevator in a lowermost position and the can supporting surface in an upright position, and Figure 11 is a diagrammatic view illustrating the electric circuit of the machine.

Figure 1:
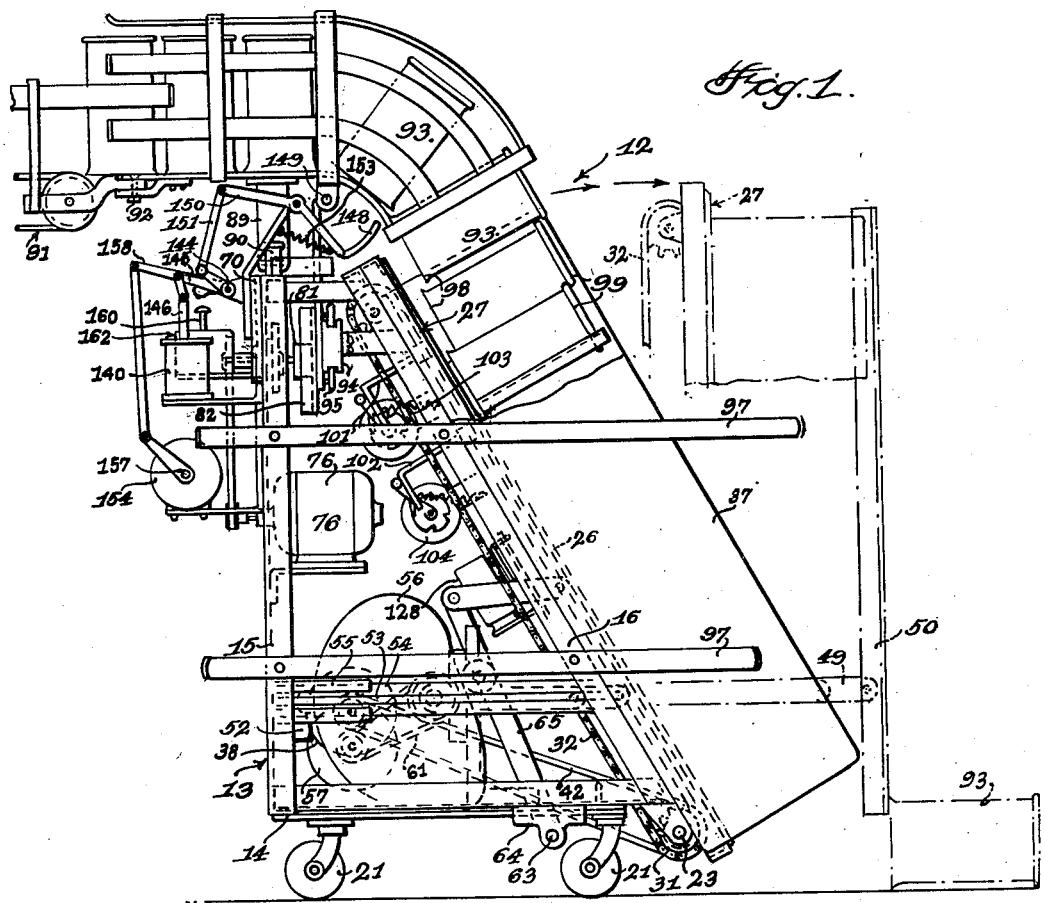
Figure 1 is a side elevational view showing the machine with the parts as they will appear while the machine is being loaded with a stack of cans.
Figure 8:
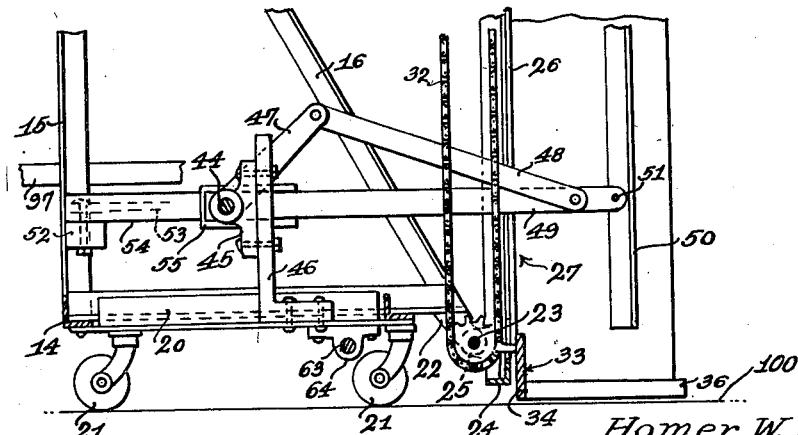
Figure 8 is a vertical sectional view taken substantially along a plane as indicated by the line 8—8 of Figure 4.

Referring more specifically to the drawings, the can stacking machine in its entirety is designated generally 12 and includes a mobile supporting frame, designated generally 13, which preferably includes a rectangular bottom frame portion 14, formed of angle iron, upright rear corner posts 15 and upwardly and rearwardly inclined front corner posts 16, said posts 15 and 16 being connected at their upper ends by top cross braces 17. The rear corner posts 15 are also connected by a top frame member 18 and the front corner posts are similarly connected at their upper ends by a top frame member 19 which is spaced from and disposed substantially parallel to the frame member 18. The parts 15 to 19 are likewise preferably formed of angle iron. The bottom frame portion 14 also includes cross braces 20, as seen in Figure 2, which extend from front to rear thereof. The mobile frame 13 is supported on castors 21.

The bottom of the frame 14 is provided at its forward portion and adjacent its ends with downwardly and forwardly extending brackets 22 forming bearings for journalling the end portions of a shaft 23. A rectangular frame 24, formed of angle iron, is provided adjacent its bottom with bearing portions 25 which project from the inner side thereof and which are journalled on the shaft 23 for swingably mounting the frame 24 on the mobile frame 13 and adjacent the lower, forward end of said frame 13. A plurality of rods 26 which are disposed in spaced substantially parallel relationship extend between the top and bottom portions of the frame 24 and are secured at their ends to said top and bottom frame portions so that said rods 26 combine with the frame 24 to form a wall, designated generally 27, of grillwork construction which is adapted to normally rest against the upwardly and rearwardly inclined front corner posts 16 and to be supported thereby in an upwardly and rearwardly inclined position and with the upper end or edge of the wall 27 disposed at approximately the level of the top of the frame 13, as illustrated in Figure 1. As best seen in Figure 3, the frame 24 is provided adjacent its upper edge with inwardly or rearwardly extending bearings 28 for journalling a shaft 29 on which is mounted a pair of sprocket wheels 30. As seen in Figure 4, a pair of sprocket wheels 31 is fixed to the shaft 23, one of which aligns with each of the sprocket wheels 30 and an endless sprocket chain 32 is trained over each sprocket wheel 30 and the sprocket wheel 31 disposed therebeneath.

An elevator, designated generally 33, includes a plate 34 having end portions which ride upon the ends of the frame 24 and which is provided with inwardly extending pairs of brackets 35, one of which pairs of brackets 35 is secured to one of the chains 32 and the other pair of brackets 35 is secured to the other chain 32. The elevator 33 includes a plurality of bars 36 of inverted V-shape cross section which project outwardly from the bottom edge of the plate 34 in spaced substantially parallel relationship to one another and which form can supporting fingers, as will hereinafter become apparent. The wall 27 is provided with outwardly extending plates 37 which are secured to and project outwardly from vertical sides of the frame 24 and which extend substantially from top to bottom of said frame and between which the elevator 33 is reciprocally mounter. An electric motor 38 is supported on the frame base 14 by a bracket 39 and has a belt pulley 40 secured to its armature shaft 41 and which is connected by a belt 42 to a belt pulley 43 fixed to the shaft 23 for revolving said shaft 23 to drive the chains 32 which carry the elevator 33; the shaft 29 constituting an idler shaft.

A cam shaft 44 is journalled in bearings 45 which are supported on standards 46. The standards 46 are fixed to and rise from the frame members 20. A crank 47 is fixed to each end of the cam shaft 44 and each crank 47 is pivotally connected at its free end to one end of a rigid link 48. The rigid links 48 extend forwardly from the cranks 47 and are pivotally connected at their opposite ends, each to a push rod or bar 49. The push rods or bars 49 are pivotally connected at their forward ends each to a bar 50 of angle iron which is normally disposed within the grillwork wall 27, said bars 50 being pivotally connected to the push rods 49, intermediate of their ends, as seen at 51. A bracket 52 is fastened at each end of the frame 13 and supports a guide rail 53 having a T-shaped head 54 on which is slidably mounted a channel member 55 having a T-shaped slot. Each push rod 49 is fixed to a channel member 55 and each of said push rods 49 is similarly guided, as best illustrated in Figure 4, for movement forwardly and rearwardly relatively to the frame 13. As seen in this figure, the cranks 47 are disposed beyond the bearings 45 and a cam 56 is fixed to the shaft 44 inwardly of and adjacent each bearing 45, said cams 56 being of the same shape and similarly disposed with respect to the shaft 44. An electric motor 57 which is supported in the frame 13 on a bracket 58 has an armature shaft 59 provided with a sprocket wheel 60 which is connected by an endless chain 61 to a sprocket wheel 62 which is fixed to the shaft 44. A shaft 63 is journalled beneath the frame base 14, forwardly of the shaft 44 by bearings 64 which are fastened to and depend from the frame base 14 and a pair of lever arms 65 are secured to and extend upwardly from said shaft 63. As best illustrated in Figure 7, the lever arms 65 are each connected at its upper end by a rigid link 66 to an upright angle member 67 which is secured in the frame 24 and which extends between the top and bottom thereof. The levers 65 are disposed each to one side of one of the cams 56 and in close proximity thereto and each lever 65 has a roller 68 journalled at a side thereof on a pin or stub shaft 69 and which rollers are disposed in engagement with the eccentric peripheries of the cams 56, as illustrated in Figure 7, and engage the cam surfaces which are disposed adjacent the shaft 44, when the grillwork wall 27 is in a normal upwardly and rearwardly inclined position resting against the front corner posts 16. When the cams 56 are thus disposed, as seen in Figure 7, the cranks 47 extend away from the grillwork wall 27 so that the push rods 49 are in fully retracted positions.

As seen in Figure 4, a hanger plate 70 is secured to and depends from the top frame member 18 adjacent each rear corner post 15 and each hanger plate 70 supports a stub shaft 71. A sprocket wheel 72 is fixed to each stub shaft 71 and an endless chain 73 is trained over the sprocket wheels 72 and extends longitudinally of the upper rear portion of the frame 13. One of the stub shafts 71 and its sprocket wheel 72 forms an idler shaft and the other stub shaft 71, as best seen in Figure 6, has a belt pulley 74 fixed thereto and around which an endless drive belt 75 is trained. An electric motor 76 is supported on a bracket 77, secured to the frame 13, below said driven stub shaft 71 and the armature shaft 78 thereof has a belt pulley 79 fixed thereto over which the drive belt 75 is trained for driving the chain 73 from the armature shaft 78. As seen in Figure 6, a pin 80 is fixed to and projects laterally from a link of the chain 73 in a direction forward of the frame 13 and has a block 81 fixed to its forward end which interfits in a slot 82 of a plate 83 and which permits the block 81 to reciprocate vertically relatively to the plate 83 so that the plate will be carried by the block 81 and chain 73 with said block engaging the upper end of the slot 82 when supported by the upper flight of the chain 73 and thence moving downwardly to engage the lower end of the slot 82 as said block is supported by the bottom flight of the chain 73. Thus, the block 81 moves in an endless path corresponding to the shape of the chain 73 and in so moving causes the plate 83 to reciprocate longitudinally of the frame 13. A supporting standard 84 is fixed to and rises from the plate 83 and is pivotally mounted at its upper end at 85 to the lower part of the intermediate portion of a feeder chute 86 which has angularly disposed ends 87 and 88 and which feeder chute 86 is of substantially rectangular cross section and preferably of open-work construction. The inlet end 87 which extends rearwardly from the frame 13 is supported in substantially a horizontal plane by a depending leg 89 which has a roller 90 journalled in its lower end and which roller rides upon the frame member 18 as the feeder chute 86 is reciprocated longitudinally of the frame 13 with the plate 83, as previously described by movement of the chain 73.

A conveyor 91, constituting no part of the present invention and only one end portion of which has been illustrated in Figure 6 has a discharge end which is pivotally connected at 92 to the inlet end 87 of the feeder chute 86 so that by swingably supporting the opposite end, not shown, of the conveyor 91, the end which is connected to the feeder 86 may swing and travel with the feeder 86 as it is reciprocated longitudinally of the frame 13. The conveyor 91 is intended to be readily movable with the machine 12 so that when the machine 12 is displaced from right to left of Figure 1, the conveyor 91 may move therewith and in the same direction. The conveyor 91 is shown as having an endless belt for conveying cans 93 into the inlet end 87 of the feeder chute 86 but obviously, any suitable conveying means may be provided and if desired, the conveyor 91 may provide a gravity feed to the feeder 86.

A guide rail 94 has grooved top and bottom edges which are engaged by rollers 95. The rollers 95 are journalled on pins 96 which project from the standard 84 in the opposite direction to the bar 83. The guide rail 94 extends longitudinally of the frame 13 and is supported at its ends on the front corner posts 16.

The forward discharge end 88 of the feeder chute 86 is curved downwardly and opens above and adjacent the grillwork wall 27 when said wall is inclined upwardly and rearwardly, as seen in Figure 6 for discharging the cans 93 therefrom onto the elevator 33.

A pair of guide bars 97 is secured to each side of the frame 13 and said guide bars extend forwardly from the front corner posts 16 to provide guides for the grillwork wall 27 as it swings between its positions of Figures 1 and 3.

Assuming that the grillwork wall 27 is in its upwardly and rearwardly inclined position of Figure 1, the motor 38 may be energized to cause its armature shaft 41 to revolve rapidly in one direction so as to drive the shaft 23 in a counterclockwise direction as seen in Figure 1 until the elevator 33 is carried by the chain 32 upwardly to its uppermost position. The motor 38 is then energized by a rheostat switch to turn its armature shaft 41 at a slow speed in the opposite direction to cause the elevator 33 to move downwardly at a relatively slow speed. At the same time that the elevator 33 commences its downward movement, the electric motor 76 is energized to drive the chain 73 in one direction causing the chute 86 to be carried by the chain, as previously described, in a reciprocating movement back and forth across the top of the frame 13 and at a relatively slow speed and beginning from one end of said frame. As the chute 86 thus traverses the top of the frame 13 in one direction, it deposits a bottom row or course of cans 93 on the elevator 33 and with the individual cans 93, as illustrated in Figure 5, each resting between two adjacently disposed fingers 36 and supported in an upwardly and outwardly inclined relationship with respect to the elevator 33 so that the inner open flanged ends 98 of the bottom row or course of cans 93 will rest against the elevator plate 34. After the feeder chute 86 has traversed the frame 13 from left to right of Figure 5, it will have deposited a complete bottom row of cans 93 on the can supporting fingers 36 and during this traversing movement of the feeder 86 from one end to the other of the frame 13, the elevator 33 will have been moved downwardly a distance equal to the diameter of any one of the cans 93 so that as the feeder 86 moves in the opposite direction or from right to left of Figure 5 it will deposit a second row of cans 93 upon the first row of cans and with the cans of the second row fitting between the cans of the first row and with the flanges 98 of said second row engaging in front of the flanges 98 of the bottom course of cans and similarly the rims 99 of the outer closed ends of the cans are likewise interlocked with the rims 99 of the second course engaging outwardly over the rims 99 of the course disposed therebeneath. This operation will be continued and repeated until the elevator 33 reaches the lower end of the wall 27 and the feeder chute 86 has once again traversed the frame 13, at which time the inclined wall 27 will be completely filled with a plurality of rows of cans 93 stacked thereon. At this time, operation of the motors 38 and 76 is interrupted and the motor 57 is then energized for revolving the cam shaft 44 in a clockwise direction and from its initial position of Figures 1 and 7. When this occurs, the rollers 68 in riding over the eccentric peripheries of the cams 56 will be displaced forwardly of the frame 13 thus swinging the levers 65 in a forward direction so that their links 66 will exert a forward thrust on the wall 27 through the connection of the links 66 to the bars 67 of said wall until when the cams 56 have turned through an arc of approximately 90°, the wall 27 will have been swung upwardly so that it will be disposed in an upright position and with the elevator fingers 36 resting on a supporting surface 100. Thereafter, the periphery of the cams 56 will ride out of engagement with the rollers 68; however, as the wall 27 is swung to its upright position by the cams 56, as previously described, the cranks 47 will have swung from their position of Figure 7 upwardly and forwardly to substantially upright positions. Thereafter, the cranks 47 will continue to swing forwardly so that after the wall 27 is disposed in an upright position, the links 48 will continue to project the push rods 49 forwardly of the frame 13 and the bars 50 will then be displaced forwardly from their nested positions in the wall 27 to and beyond their positions of Figure 3 for ejecting the stack of cans 93 off of the elevator 33. Actually, if the cans 93 are being stacked on a platform or stationary supporting surface as illustrated in the drawings at 100, a first stack of cans will be in engagement with an upright wall surface 100a when the bars 50 commence to move forwardly of the wall 27 so that instead of the cans being displaced away from the machine 12, the machine 12 will roll away from the cans on its castors 21, as for example from right to left of Figure 3, a distance equal to the length of the cans and will subsequently roll in the same direction as another stack of cans is stacked against the left-hand side of the stack as shown in Figure 3. If, on the other hand, the cans are to be stacked on a dolly, the castors 21 may be chocked on a surface located above the dolly platform, not shown, and if the machine 12 is thus held immobile the dolly will be pushed away from the machine each time that a stack of cans is ejected from the elevator 33 by the bars 50.

After the stack of cans has thus been disengaged from the elevator 33, the cranks 47 will have swung downwardly and forwardly to beyond horizontal positions and will thereafter commence to swing rearwardly for exerting a rearward pull on their links 48 and thus on the push rods 49 for pulling the bars 50 rearwardly and toward the wall 27. When the bars 50 have resumed their nested positions in the wall 27, further movement of the cranks 47 in a rearward direction will cause the bars 50 to exert a pull on the wall 27 resulting in the wall 27 swinging on its pivot 23 back to its inclined position against the frame posts 16. However, the rollers 68 by engaging the cams 56 will prevent a violent swinging of the wall 27 toward the frame 13 and as the push rods 49 return to their fully retracted positions of Figure 7, the cams 56 will be likewise in their positions of Figure 7 since the cam shaft will then have completed one revolution, whereupon the electric motor 57 is de-energized and the motor 38 energized in the first mentioned direction to rapidly revolve the armature shaft 41 to move the elevator 33 upwardly until it has resumed its uppermost position, preparatory to repeating the cycle of operation, just previously described.

One arrangement of an electric circuit for accomplishing automatic operation of the machine 12 has been illustrated diagrammatically in Figure 11 and the various switches for controlling such circuit has been illustrated in other views of the drawings. Assuming that the grillwork wall 27 is approaching its position against the frame members 16 after a stack of cans 93 has been discharged from the machine 12, a pair of switch actuating elements 101 and 102 are secured to and project rearwardly from the wall 27 and a pair of switches 103 and 104 is supported on one of the frame members 16, said switches 103 and 104 each including a rotatably mounted ratchet wheel 105 and a swingably mounted actuating arm or lever 106 which is spring urged to turn clockwise, as seen in Figure 3, to its full line position of said figure by a contractile coiled spring 107 which is connected thereto and to the frame members 16. Each lever or arm 106 carries a pivotally mounted pawl 108 for selectively engaging one of four equally spaced notches 109 in the complementary ratchet wheel 105. Accordingly, as the wall 27 swings from its position of Figure 3 counterclockwise toward its position of Figure 1 and as it approaches its position of Figure 1, the switch actuator 101 engages the lever 106 of the switch 103 and the switch actuator 102 engages the lever 106 of the switch 104 for simultaneously swinging said levers in a counterclockwise direction through an arc of 90° from their positions of Figure 3 to their positions of Figure 1 for turning the ratchet wheels 105 the same distance and in the same direction due to the engagement of the pawls 108 each with a notch 109. This movement of the switches 103 and 104 is completed as the wall 27 reaches its position of Figure 1 from its position of Figure 3. As illustrated in Figure 11, the switch 103 is connected to the motor 57 which drives the cam shaft 44 and this movement of the switch 103 de-energizes the electric circuit to the motor 57 to interrupt rotation of the cam shaft 44 with the cams 56 in their positions of Figure 1. Similarly, this counterclockwise movement of the switch 104 energizes the electric motor 38 to cause the motor armature to be revolved in a direction so that the elevator 33 will move upwardly relatively to the wall 27. Positive and negative electric conductors 110 and 111, respectively, are illustrated in Figure 11 leading from a suitable source of electric current, not shown, and a branch conductor 112 leads from the positive conductor 110 through the motor 38 and a negative electrical conductor 113 leads from the conductor 111 to the motor 38 and the switch 104 is interposed in the conductor 113. A branch conductor 114 leads from the conductor 110 to the motor 57 and a branch conductor 115 connects the motor 57 to the conductor 111 and has the switch 103 interposed therein. Figure 11 illustrates the switches 103 and 104 in their positions just prior to the time that they are actuated by the switch operators 101 and 102, as just previously described. A brace member 116 extends from top to bottom of the frame 24 and is secured therein. The brace 116 is provided with a pair of guide members 117 which project laterally therefrom and in which is reciprocally supported a rod 118 having a laterally turned lower end 119 and a laterally turned upper end 120, as best illustrated in Figure 4. A lug 121 is fixed to and projects laterally from the intermediate portion of the rod 118 and is disposed to engage a yoke shaped end 122 of a lever 123 which is pivotally mounted intermediate of its ends at 124 and which has an opposite bifurcated end 125 which engages a laterally turned end 126 of a switch lever 127 which forms a part of a switch 128. The switch 128 is constructed like the switches 104 and 103, as seen in Figure 5, and includes a rotatable contact member 129 having four equally spaced notches 130 to receive a spring pressed pawl 131 which is urged into engagement with the notches 130 for turning the switch part 129 to reverse the position of said switch only when the end of the lever designated 126 is swung upwardly as on the downward swinging movement of the lever end 126, the pawl 131 rides the periphery of the ratchet wheel 129 out of engagement with one notch 130 into engagement with another notch 130. A solenoid switch 132 is supported in a housing 133 which housing and the switch 128 are supported by a bracket 134 which extends laterally from the brace 116. The switch 132, as best seen in Figure 11, has a pin 135 which extends outwardly through a slot 136 in the housing 133 and which engages a slot 137 of the lever 123. An over center spring 138 attached to the lever 123 and housing 133 retains the lever 123 at an incline in either direction. Accordingly, as the elevator 33 reaches the upper extremity of its movement a pin 139, which extends inwardly therefrom strikes the rod end 120 to swing the lever 123 from its position of Figure 4 to its position of Figure 5. This movement of the lever 123 does not move the switch 128 from its position of Figure 11 so that the motor 38 remains energized; however, this upward displacement of the rod 118 and the pin 121 which rocks the lever 123 to its position of Figure 5 causes the solenoid switch 132 to assume its circuit interrupting position of Figure 11 thereby de-energizing the solenoid 140. The solenoid 140 is interposed in a circuit formed by the branch conductors 141 and 142 and which are connected to the conductors 110 and 111 and the switch 132 is interposed in this circuit.

A pair of bearings 143 (see Figure 3) is secured to and projects from the upper rear portion of the frame 13 and has a jack shaft 144 journalled therein to which is fixed a crank 145 having a free end pivotally connected to the upper end of the core 146 of the solenoid 140. A bracket 147 is fixed to and rises from the upper rear left hand corner of the frame 13, as seen in Figure 5, and has a curved stop finger 148 journalled therein at 149 and which is provided with an extension 150 which projects rearwardly from the bracket 147 and which is pivotally connected to one end of a depending link 151, the lower end of which is pivotally connected to a crank 152 which extends rearwardly from and is fixed to the shaft 144. A spring 153 which is connected to the stop 148 and bracket 147 urges the finger 148 and its lever 150 to normally swing clockwise as seen in Figure 3 so that the finger 148 is urged downwardly to an inoperative position by the spring 153. Accordingly, when the solenoid 140 is de-energized by the opening of the solenoid switch 132, as previously described, its armature 146 is released allowing the spring 153 to swing the parts 148 and 150 clockwise as seen in Figure 3 to likewise turn the jack shaft 144 clockwise through the connection of the link and lever 151, 152 whereby the core 146 is elevated relatively to the solenoid. These parts are most clearly illustrated in Figure 2. A conventional reversing switch 154 (Figure 2) is supported by a bracket 155 on the rear part of the frame 13 and has a reversing bridge 156 which is swingably supported by a shaft 157, journalled in the switch 154. The shaft 157 is connected by link and lever means 158 to the jack shaft 144 so that when said jack shaft is rotated or turned clockwise, as previously described, by the action of the spring 153 the bridge 156 which is interposed in the conductor 113, between the motor 38 and switch 104, reverses its position from engagement with the contacts 157a to engagement with the contacts 158a for reversing the polarity of the electric motor 38 to cause the armature shaft of the motor 38 to be driven in the opposite direction so that the elevator 33 will then commence to move downwardly. A rheostat, not shown, may be interposed in the electric circuit of the motor 38 so that said motor will be driven at a faster R. P. M. when the elevator is moving upwardly than when the elevator is moving downwardly; however, this is not essential to the operation of the machine 12.

As an elevator 33 commences its downward movement the feeder chute 86 is in its dotted line position at the right-hand end of the frame 13, as seen in Figure 4, or at the left-hand end of the frame, as seen in Figure 2, and while the feeder 86 is thus disposed and before the solenoid 140 is de-energized, as previously described, the finger 148 extends upwardly into the chute 86, as illustrated in Figure 3, to engage one of the cans 93 to prevent the cans from being fed from the discharge end 98 of the chute; however, when the solenoid is de-energized and the shaft 144 is rocked clockwise by the spring 153, as previously described, the stop finger 148 is swung downwardly to release the can 93 and to clear the chute 86 so that the cans may then commence to be fed from said chute onto the elevator 33 which is in its uppermost position. Also, this movement of the jack shaft 144 causes a lever 159 which is fixed thereto to swing upwardly and out of engagement with the head of a pin 160 which rises from a resilient blade 161 of a switch 162, as best illustrated in Figure 11. When this occurs, the blade 161 is spring biased upwardly so that the switch 162 assumes a circuit closing position for energizing the motor 76 which drives the feeder chute 86, as previously described. As seen in Figure 11, branch conductors 163 and 164 connect the motor 76 to the conductors 110 and 111, respectively and the switch 162 is interposed in the conductor 164.

A second solenoid switch 165 is interposed in the conductor 142 of the solenoid 140 and is mounted, as seen in Figure 2, on the frame 13 adjacent the stop finger 148 and includes a spring blade 166 which is normally spring biased to a circuit interrupting position. A headed pin 167 projects from the blade 166 and is disposed to be engaged by a part of the chute 86 when the motor 76 is de-energized and the feeder chute 86 is in its immobile position at the left-hand end of the frame 13, as seen in Figure 2. Accordingly, as the feeder 86 commences to move from left to right of Figure 2 away from the left-hand end of the frame 13 it disengages the headed pin 167 allowing the switch blade 166 to spring away from the other switch blade supporting contact to open the switch 165. This does not affect the circuit of the solenoid 140 at this time, due to the fact that said circuit has been previously interrupted by the opening of the switch 132. The operation earlier described whereby the feeder 86 traverses back and forth across the top of the frame 13 as the elevator 33 slowly descends, continues until the elevator approaches its bottommost position of Figure 10, at which time the pin 139 strikes the rod end 119 displacing the rod 118 downwardly. The downward movement of the pin 121, carried by the rod 118, thereupon rocks the lever 123 from its position of Figure 5 to its position of Figure 4. When this occurs the switch 128 is actuated by the pawl 113 traveling upwardly so that the conductor bridge of said switch swings through an arc of 90° thereby contacting the other two switch contacts and thus de-energizing completely the circuit of the motor 38 to stop operation of the elevator 33. At the same time, the switch 132 is returned to a circuit closing position as its pin 135 is displaced upwardly by the upward swinging movement of the slotted lever portion 137 which engages said pin but the solenoid 140 is not then energized due to the fact that the switch 165 is still in a circuit interrupting position, so that the feeder motor 76 will continue to operate until the feeder chute 86 has completed its traverse of the frame 13 from right to left, as seen in Figure 5, thus allowing the feeder 86 to complete the last or top row or course of the stack of cans being formed. When the feeder 86 has reached the left-hand end of the frame 13, as seen in Figure 5, it will then strike the pin 167 and close the switch 165 and as the switch 132 is already closed, this will re-energize the solenoid 149. When the solenoid 140 is energized, its armature 146 will be drawn downwardly turning the jack shaft 144 counterclockwise, as seen in Figure 3, thus moving the stop 148 upwardly into the chute 86 to prevent the cans 93 from being fed therefrom, this also moving the lever 159 into engagement with the pin 160 to open the switch 162 and de-energize the feeder motor 76 and stop the feeder. This counterclockwise movement of the jack shaft 144 will also turn the shaft 157 in the opposite direction through its link and lever connection to the jack shaft 144 for returning the conductor bridge 156 of the reversing switch 154 back to its initial position in engagement with the contact 157a, so that when the elevator motor 38 is again energized its armature shaft will be driven in the opposite direction to move the elevator 33 upwardly, as previously described.

A switch 168, corresponding to the switch 103 and which is likewise interposed in the circuit of the motor 57 is mounted on a bracket 169 which is supported by the frame 13 and is disposed behind said frame and has a ratchet wheel 170 provided with four equally spaced notches which are selectively engaged by a pawl 171 to turn said ratchet wheel 170 only in a counterclockwise direction, as seen in Figure 6 and only when the lever 172 which carries the pawl and which is pivotally mounted on the switch 168 is swung downwardly. A lever 173 is fixed to and extends rearwardly from the jack shaft 144 above the lever 172 and said levers are connected at their free ends by a link 174. Accordingly, when the solenoid 140 is energized, as previously described it turns the jack shaft 144 counterclockwise, as seen in Figures 3 and 6, the lever 175 will move from its position of Figure 6 to its position of Figure 3 to thereby turn the conductor bridge of the switch 168 through an arc of 90° from its position of Figure 11 and into engagement with the other two oppositely disposed contact points of said switch, to thus re-energize the electric motor 57, since the two contact bridges of the switches 103 and 168 will then each be disposed at a right angle to their positions of Figure 11. When this occurs, the motor 57 will drive the cam shaft 44 at a very slow speed through an arc of 360° to accomplish the swinging of the wall 27 to an upright position and the disengaging of the stack of cans from the elevator fingers 36, as previously described, and during which time the wall 27 will swing from its upright position of Figure 3 back to its position of Figure 1 so that as the cam shaft 44 completes one revolution the switch actuators 101 and 102 will have again swung the levers 106 counterclockwise, as seen in Figures 1 and 3, from their positions of Figure 3 to their positions of Figure 1 to thereby de-energize the cam shaft motor 57 and energize the elevator motor 38, as previously described. It will be readily apparent that when the grill-work wall 27 is swung toward an upward position the switch actuators 101 and 102 move therewith and out of engagement with the levers 106 allowing the spring 107 to return the levers 106 to their positions of Figure 3. Accordingly, the operation previously described will then repeat itself in the same cycle, thus providing a machine which may operate automatically for stacking cans 93.

Referring to Figure 1, it will be observed that the discharge end 88 of the feeder chute 86 is disposed outwardly of the wall 27, when said wall is resting against the frame members 16 so that each can 93 discharged therefrom will be spaced outwardly from the two cans disposed therebeneath and will then slide by gravity toward the wall 27 so that the flanges 98 and 99 of each can 93 will be displaced forwardly with respect to the flanges of the cans disposed therebeneath. As a result, when the stack of cans is discharged from the machine this overlapping relationship of the end flanges, which has been considerably exaggerated in Figure 1, will prevent the cans of the stack from sliding from right to left of Figure 3.

Various modifications and changes are contemplated and may obviously be resorted to, without departing from the spirit or scope of the invention as hereinafter defined by the appended claims.

I claim as my invention:

1. A tin can stacker comprising a supporting frame having an upwardly and rearwardly inclined front portion, a wall member against which cans are adapted to be stacked swingably mounted adjacent its lower edge on the lower portion of the front edge of said frame normally resting against the inclined front of the frame and disposed parallel thereto, an elevator mounted along the outer side of said wall, driven means connecting said elevator to the wall and moving the elevator intermittently upwardly and downwardly from bottom to top and top to bottom of said wall, a feeder chute mounted on the frame and disposed thereabove, driven means supported by the frame and connected to said chute and moving the feeder chute back and forth from end-to-end of the frame, said feeder chute having a downwardly inclined discharge end opening above the upper edge of said wall, when the wall is disposed against the inclined front surface of the frame, for discharging cans to be stacked from said feeder chute onto the elevator or onto a course of cans disposed therebeneath as the elevator is moved downwardly, intermittently actuated cam means rotatably mounted in the frame and actuated when the elevator has reached a lowermost position to engage and swing said wall, the elevator and cans supported thereby away from the inclined front wall of the frame to an upright position, pushing means actuated simultaneously with said cam means and displaced forwardly from said wall, when the wall is swung to an upright position, for displacing the stack of cans disposed against the wall and supported by the elevator out of engagement with the elevator and wall, said pusher means being thereafter retracted and initially assuming a nested position in said wall and thereafter swinging the wall back to an inclined position against the front wall of the frame.

2. A tin can stacker as in claim 1, and wheels depending from the supporting frame and combining therewith to form a mobile support for the can stacking machine whereby the machine will be displaced away from a stack of cans supported by the elevator by the outward displacement of the pushing means for disengaging the machine from the cans stacked thereon and supported thereby.

3. A tin can stacker as in claim 2, and means mounted on said frame and interrupting the operation of said second mentioned driven means when the elevator has reached the lowermost position of its movement and after the feeder chute has completed its movement longitudinally of the frame and in one direction and before operation of said cam means is begun.

4. A tin can stacker as in claim 2, means mounted on said frame and interrupting the operation of said second mentioned driven means when the elevator has reached the lowermost position of its movement and after the feeder chute has completed its movement longitudinally of the frame and in one direction and before operation of said cam means is begun, and means actuated by the elevator reaching the uppermost position of its travel for causing said second mentioned driven means to resume operation.

5. A tin can stacker as in claim 1, an electric motor of the reversible type connected to and driving the driven means of said elevator, a reversing switch supported by the frame and actuated by the elevator upon reaching the upper and lower extremities of its movement for reversing the electric motor, a first switch supported by the frame and engaged and actuated by the elevator, when it reaches its lower extremity of travel for de-energizing the elevator motor, and a second elevator motor switch supported by the frame and engaged by a part of said swingable wall as the wall moves to an inclined position against the front of the supporting frame to re-energize the elevator motor.

6. A tin can stacker as in claim 1, means mounted on said frame and interrupting the operation of said second mentioned driven means when the elevator has reached the lowermost position of its movement and after the feeeder chute has completed its movement longitudinally of the frame in one direction and before operation of said cam means is begun, means actuated by the elevator reaching the uppermost position of its travel for causing said second mentioned driven means to resume operation, and a stop member pivotally mounted on the supporting frame and disposed beneath the feeder chute when the movement of the feeder chute is interrupted, said stop being actuated simultaneously with interruption of the operation of said second driven means and being swung upwardly into the discharge end of the feeder chute for blocking the discharge of cans therefrom.

7. A tin can stacker as in claim 1, said second driven means including a driven endless chain disposed longitudinally of the supporting frame having upper and lower flights, a block fastened to a portion of said chain and disposed to one side thereof, an extension depending from the feeder chute in which said block is slidably engaged for vertical sliding movement whereby the feeder chute will travel in one direction relatively to the frame as the block is traversing the upper flight of the chain and in the opposite direction relatively to said frame when the block is traversing the bottom flight of the chain.

8. A tin can stacker as in claim 1, said elevator including a plate disposed substantially parallel to the wall member, a plurality of can supporting fingers projecting outwardly from the bottom edge of said plate and perpendicular thereto, said fingers being spaced relatively to one another longitudinally of the plate for supporting a bottom course of cans on the elevator and with each of the cans engaging between two of the can supporting fingers.

9. A tin can stacker as in claim 1, said elevator including a plate disposed substantially parallel to the wall member, a plurality of can supporting fingers projecting outwardly from the bottom edge of said plate and perpendicular thereto, said fingers being spaced relatively to one another longitudinally of the plate for supporting a bottom course of cans on the elevator and with each of the cans engaging between two of the can supporting fingers, said fingers each being of inverted V-shaped cross section.

10. A tin can stacker comprising a supporting structure including a front wall member normally inclined downwardly and forwardly and against which cans are adapted to be stacked, said front wall member being swingably supported on the supporting structure adjacent its lower edge for swinging movement in a vertical plane from an inclined position to an upright position, an elevator extending along the outer side of said front wall member, a first driven means connecting the elevator to the wall member and which is operable for moving the elevator upwardly and downwardly between the top and bottom of the wall member, a feeder chute mounted on the supporting structure and having a downwardly inclined discharge end disposed above the upper edge of the wall member when the latter is in an inclined position, a second driven means mounted on the supporting structure connected to and driving the feeder chute reciprocally along the upper edge of said wall member for discharging cans to be stacked in courses against the wall member and on the elevator as the elevator is being conveyed downwardly of said wall member by said first driven means, intermittently driven cam means mounted in the supporting structure and connected to the wall member and swinging the wall member to an upright position when the elevator is at the lower end thereof, and pusher means nested in said wall member and operatively connected to said cam means, said pusher means being displaced outwardly of the wall member when the wall member is in an upright position for disengaging the stack of cans from the wall member and elevator, said pusher means being thereafter withdrawn to a nested position in said wall member and subsequently functioning to swing the wall member inwardly of the supporting structure back to its initial upwardly and rearwardly inclined position.

11. A tin can stacker as in claim 10, said wall member being of grillwork construction having spaced rods extending from top to bottom thereof against which the cans are stacked.

12. A tin can stacker as in claim 10, the discharge end of said feeder chute being offset outwardly with respect to the upper edge of the wall member whereby the cans discharged therefrom will be spaced outwardly from previously discharged cans supported by the elevator and will slide toward the wall member for interlocking the end flanges of the stacked cans.

13. A tin can stacker as in claim 10, means for interrupting operation of the feeder chute when the elevator has reached its lowermost position of travel and when the feeder chute has thereafter completed its movement in one direction relatively to the supporting structure, and a stop member operated simultaneously with said last mentioned means and movable into the discharge end of the feeder chute for blocking the discharge of cans therefrom while the stacked cans are being unloaded from the elevator.

14. A tin can stacker as in claim 1, said feeder chute being of rectangular cross section and openwork construction.

15. A tin can stacker as in claim 1, a first electric motor mounted on the supporting structure and connected to and driving said elevator, a second electric motor mounted on the supporting structure connected to and driving the second driven means for reciprocating the feeder chute, and a third electric motor mounted on the supporting structure and connected to and driving the cam means and pusher means.

16. A tin can stacking machine comprising a supporting structure having a swingably mounted wall normally disposed at an incline and against which cans are adapted to be stacked in courses when the wall is disposed at an incline, an elevator disposed on the outer side of said wall and extending from end-to-end thereof, said elevator having can supporting elements projecting perpendicularly from the plane of said wall on which the bottom course of the stacked cans are supported, a feeder chute mounted on the supporting structure having a downwardly inclined discharge end opening above said wall when the wall is disposed at an incline and adapted to feed cans therefrom onto the wall and elevator, feeder drive means reciprocably moving the feeder chute back and forth along the top of the wall, elevator drive means moving the elevator from top to bottom of the wall as the feeder chute is reciprocated, means for rocking the wall away from the supporting structure to an upright position when the elevator has reached a lowermost position of its travel, and an intermittently driven unloading means including elements disposed in nested positions in the wall for swinging movement therewith, said elements being actuated by an intermittently driven portion of the unloading means when the wall is in an upright position for movement outwardly of the wall from a nested position therein and behind the cans for engaging and displacing the cans away from said wall for unloading the cans from the elevator.

HOMER W. MADDEN.

References Cited in the file of this patent

UNITED STATES PATENTS

| Number | Name | Date |
|---|---|---|
| 1,933,147 | Paxton | Oct. 31, 1933 |
| 2,161,836 | Stevenson | June 13, 1939 |